(12) United States Patent
Gnanavadivel et al.

(10) Patent No.: US 11,994,314 B2
(45) Date of Patent: May 28, 2024

(54) RECTANGULAR FLANGED BUBBLE TIGHT DAMPER

(71) Applicant: Air Distribution Technologies IP, LLC, Milwaukee, WI (US)

(72) Inventors: Raguraman Gnanavadivel, Tamil Nadu (IN); Sathish Nagabooshanam, Kavaraipettai (IN); Vinothkumar Muthu, Ramanathapuram (IN); Sathish Palanisamy, Coimbatore (IN); John Bernard Haukap, Lee's Summit, MO (US); Timothy Alan Lockard, Sedalia, MO (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 542 days.

(21) Appl. No.: 16/814,652

(22) Filed: Mar. 10, 2020

(65) Prior Publication Data

US 2021/0285687 A1 Sep. 16, 2021

(51) Int. Cl.
| F24F 13/14 | (2006.01) |
| F16K 27/10 | (2006.01) |
| F24F 13/16 | (2006.01) |

(52) U.S. Cl.
CPC ........ *F24F 13/1406* (2013.01); *F16K 27/102* (2013.01); *F24F 13/1486* (2013.01); *F24F 13/16* (2013.01)

(58) Field of Classification Search
CPC ...... F24F 13/084; F24F 13/1486; F24F 13/16; F16K 27/102
See application file for complete search history.

(56) References Cited

U.S. PATENT DOCUMENTS

| 2,699,106 | A | * | 1/1955 | Hoyer | F24F 13/1413 137/870 |
| 3,286,405 | A | * | 11/1966 | Schembri | E06B 3/96 49/504 |
| 3,963,070 | A | | 6/1976 | Alley et al. | |
| 10,414,246 | B2 | * | 9/2019 | Shibata | B60H 1/3421 |
| 2011/0319005 | A1 | * | 12/2011 | Sawada | B60H 1/00678 454/155 |
| 2018/0147914 | A1 | * | 5/2018 | Ito | B60H 1/00671 |

FOREIGN PATENT DOCUMENTS

| CN | 108995506 | A | * | 12/2018 | ........... B60H 1/3421 |
| EP | 1264080 | B1 | | 12/2004 | |
| GB | 1158794 | A | * | 9/1967 | |
| GB | 1200980 | A | | 8/1970 | |
| JP | 3605395 | B2 | | 12/2004 | |
| KR | 200267465 | Y1 | | 3/2002 | |
| KR | 1694620 | B1 | | 1/2017 | |

* cited by examiner

*Primary Examiner* — Steven S Anderson, II
(74) *Attorney, Agent, or Firm* — Fletcher Yoder, P.C.

(57) ABSTRACT

The present disclosure provides a damper used in heating, ventilation, and air conditioning (HVAC) systems. In an aspect, the damper may include a frame composed of at least two attached frame webs, each frame web comprising a C-shaped component. The damper may further include a damper blade removably attached to each compartment formed by the frame webs.

17 Claims, 5 Drawing Sheets

RECTANGULAR FLANGED BUBBLE TIGHT DAMPER

BACKGROUND

The present disclosure relates generally to dampers, and, more particularly, dampers such as the type used in heating, ventilation, and air conditioning (HVAC) systems.

A variety of buildings have HVAC equipment that may, for example, provide conditioning such as heating, cooling, ventilation, filtration, humidification, and/or dehumidification to improve the environment within the residential and/or commercial building. Dampers are classified into two major types (industrial & Commercial) based on the application. Product referred to as "bubble tight" dampers (per AMCA Standard 500-D) play an important role in providing isolation in systems within such applications as nuclear power plants, laboratories, hospitals & military bases. The air flow in HVAC systems is typically controlled by dampers. Dampers have a number of blades/vanes that open and close and are placed in the air stream of ducts to control the air flow. However, current bubble tight dampers in the market may suffer from drawbacks such as unacceptably high pressure drop values, complexity of design with expensive manufacturing procedures, heavier construction, and unreliable leakage performance. Accordingly, improvements are desired in HVAC systems.

SUMMARY

The following information presents a simplified summary of one or more implementations in order to provide a basic understanding of such implementations. This summary is not an extensive overview of all contemplated implementations, and is intended to neither identify key nor critical elements of all implementations nor delineate the scope of any or all implementations. Its sole purpose is to present some concepts of one or more implementations in a simplified form as a prelude to the more detailed description that is presented later.

The present disclosure provides a damper used with a heating, ventilation, and air conditioning (HVAC) system. In an aspect, a damper may include a frame composed of at least two attached frame web sections welded together at the junction, each frame web in a C-shaped sheet metal (formed) component and a rectangular shaped double skin damper blade welded to the axle which is supported by bearings at each penetration through the damper web. The damper would typically be operated manually or automatically using actuation.

The present disclosure provides a cost effective design with fewer parts involved for a basic damper construction. Also, this cost effective design results in reduced overall assembly time. Moreover, the number of welds in the assembly is directly proportional to part count of the assembly.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

BRIEF DESCRIPTION OF THE DRAWINGS

The disclosed implementations will hereinafter be described in conjunction with the appended drawings, provided to illustrate and not to limit the disclosed implementations, wherein like designations denote like elements, and in which.

DETAILED DESCRIPTION

Figure 1:
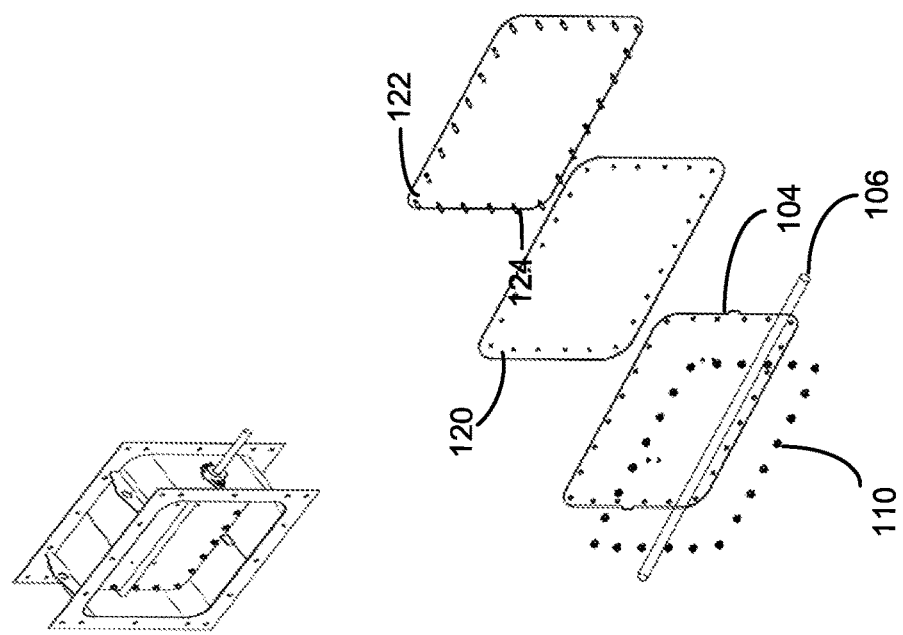
FIG. 1 is a block diagram of an example rectangular flanged bubble tight damper used in a heating, ventilation, and air conditioning (HVAC) system for system isolation purposes, according to implementations of the present disclosure.
Figure 1:
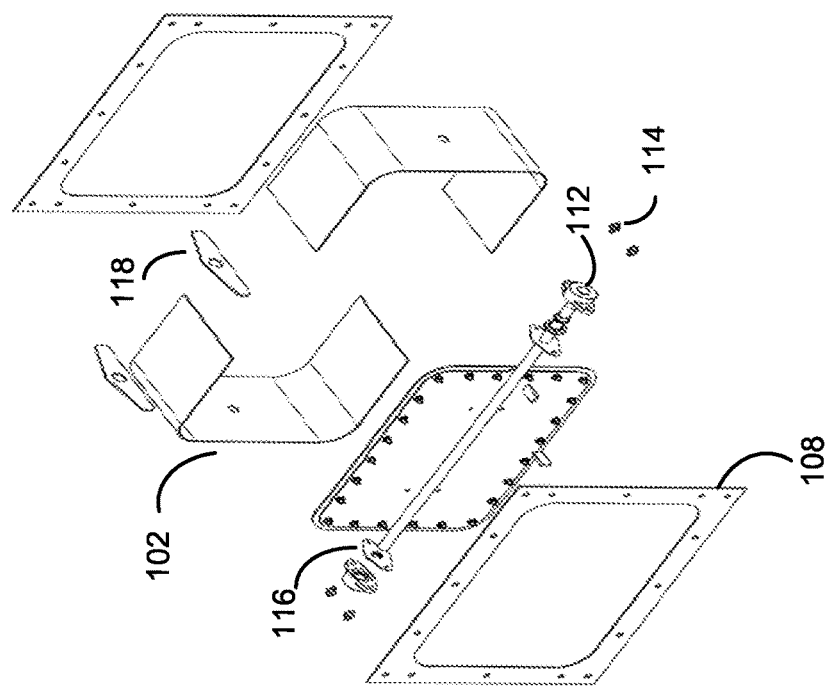

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

The present implementations generally relate to a damper used in a heating, ventilation, and air conditioning (HVAC) system. Dampers may be classified into two major types (e.g., industrial and/or commercial) based on the application. HVACs referred to as "bubble tight" dampers (per AMCA Standard 500-D) play an important role in providing isolation in systems within such applications as nuclear power plants, laboratories, hospitals, and military bases. The airflow in HVAC systems may be controlled by dampers. Dampers may have a number of blades/vanes that open and close and are placed in the air stream of ducts to control the air flow. Rotating the shaft may control the position of the blades/vanes which, in turn, controls the flow of air through the damper. Typically, the shaft may be rotated approximately ninety degrees in one direction to open the damper and approximately ninety degrees in the opposite direction to close the damper. A damper actuator may be used to rotate the shaft to open and close the damper. Damper actuators may be manually operated or electrically powered motorized devices that are connected to an HVAC control system. The HVAC control system may send electrical signals to the actuators to control the position of the dampers.

In some HVAC systems, bubble tight dampers may be used for system isolation and decontamination applications for rectangular air paths. For example, such dampers may be used in laboratories, clean rooms, medical facilities, and government buildings. However, some rectangular bubble tight dampers are designed in such a manner which may obstruct the air flow to some degree, resulting in an undesirable pressure drop value for the HVAC system. Further, the manufacturing of such complex design results in increased product cost. Additionally, these dampers may be constructed using a heavier design, having a large number of components that hinders the ability to stack/assemble dampers vertically. Moreover, these dampers may be prone to leakage, such that usage of outboard bearings with stuffing box results in higher torque and comparatively more leakage.

As such, the present implementations provide a rectangular bubble tight damper having a two-piece frame web design that results in reduced interference of airflow. Further, the rectangular bubble tight damper of the present implementations has a greater free area and lower pressure drop values. Additionally, there are fewer components that results in a lower product weight and cost. Moreover, as further discussed herein, usage of an integral bearing and shaft seal assembly at the axle prevents axle leakage and lowers torque.

In one example, the present implementations provide a damper that includes a frame that includes a first attached frame web and a second attached frame web, each of the first attached frame web and the second attached frame web comprising a C-shaped component and respectively forming a compartment. The damper may further include a damper blade removably attached to each compartment respectively formed by the first frame web and the second frame web.

In another example, the present implementations provide a HVAC system that includes a ductwork that carries airflow and a damper coupled to the ductwork and configured to regulate the airflow. The damper may include a frame that includes a first attached frame web and a second attached frame web, each of the first attached frame web and the second attached frame web comprising a C-shaped component. The damper may further include a damper blade removably attached to each compartment formed by the frame webs.

In yet another example, the present implementations provide a damper for an HVAC system that includes a frame including two coupled frame webs, each frame web comprising a C-shaped component, each frame web forming a hollow compartment, and a damper blade removably coupled to each hollow compartment.

These and other features of the disclosed louver will be discussed in more detail below in reference to FIGS. 1-5.

Referring to FIG. 1, a rectangular flanged bubble tight damper 100 may include a number of components used to regulate air flow. Specifically, the rectangular flanged bubble tight damper 100 may include a frame 102 composed of at least two attached frame webs, each frame web corresponding to a C-shaped sheet metal component. Two C-shaped frame webs may be securely attached (e.g., via welding) at a midsection of the assembled rectangular flanged bubble tight damper 100. The rectangular flanged bubble tight damper 100 may further include a double skin damper blade 104 attached to each compartment formed by the frame webs via the axle 106. The at least two attached frame webs may be securely attached (e.g., via welding) or removably attachable. The two frame webs may be attached, coupled, or fastened at a midsection of the assembled rectangular flanged bubble tight damper 100.

In some implementations, the rectangular flanged bubble tight damper 100 may include a two-piece frame design composed of at least two attached frame webs, each frame web corresponding to a C-shaped sheet metal component welded at the mid span, and a damper blade welded to the axle (damper shaft) secured by the frame webs.

Further, in some implementations, the rectangular flanged bubble tight damper 100 may include a multiple section damper assembly employing a lesser part count and lesser product weight (~30% reduction), enabling easy stacking the damper sections for the larger size requirement.

In some implementations, the blade assembly may include of securely fastening the two skin blades and damper seal with the help of a weld stud and locknut assembly to avoid leakage and reduce pressure drop.

Further, in some implementations, the rectangular flanged bubble tight damper 100 may include an integral bearing with shaft seal assembly. Specifically, usage of an integral bearing with shaft seal assembly at both ends of the frame may provide increased leakage protection, and help reduce required torque for damper operation which will result in use of lower cost actuators or reduced quantity of actuators.

In some implementations, the C-shaped component may include a flat side rectangular portion having two perpendicularly rectangular portions extending therefrom. For example, the flat side rectangular portion may form a side wall of the frame. Additionally, the two perpendicularly rectangular portions may be longer in length than the flat side rectangular portion. Each of the two perpendicular portions may extend from the side wall of the frame at 90 degree angle. Further, the angled portion may be curved. Further, each of the at least two attached frame webs may include a hole at the flat side rectangular portion.

In an example, a first C-shaped component may be joined together (e.g., via welding) to a second C-shaped component at two sections. The two sections corresponding to ends of the two perpendicularly rectangular portions. Two secured C-shaped components may form a single web, which may be stackable with other C-channel webs.

The rectangular flanged bubble tight damper 100 may further include an axle 106 secured via the hole located at each of the at least two attached frame webs. In some implementations, the axle 106 may secure the damper blade within the frame and may be configured to rotate the damper blade 104 at least 90 degrees from an air flow restriction position to air flow passage position.

In addition, the damper blade 104 may include a blade seal covering an entire surface area of one side of the damper blade. In some implementations, the damper blade 104 and/or the frame 102 may be rectangular. In some implementations, a flange plate 108 attached to one or both sides of the frame 102.

Specifically, the rectangular bubble tight damper 100 of the present implementations provides an improved outer frame blade design that provides for a more stable airflow inside the system because of a uniform cross section.

The rectangular flanged bubble tight damper 100 may further include a bearing 112 and a bearing seal 116 removably attached to each other. The rectangular flanged bubble tight damper 100 may further include lifting lug 118. The rectangular flanged bubble tight damper 100 may further include a hex lock nut 110, a blade seal 120, a weld stud 124, and a retainer 122. The hex lock nut 110 securely fastens to the weld studs 124 on the retainer 122 to securely attach the blade 104 to the blade seal 120.

Figure 2:
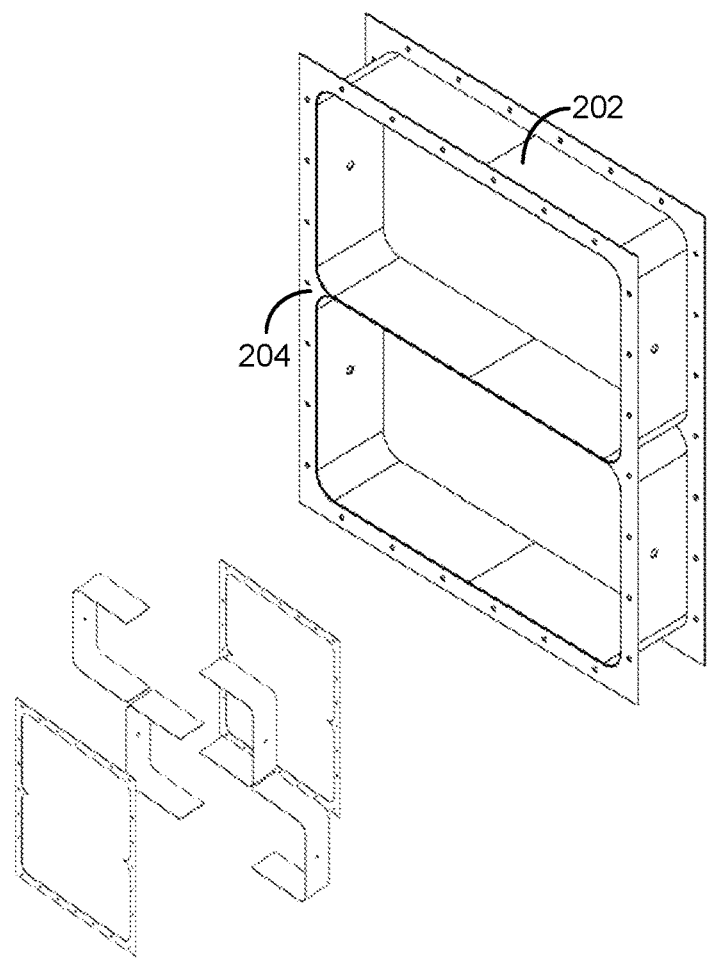
FIG. 2 is a block diagram of an example rectangular frame web design of the damper, according to implementations of the present disclosure.

Referring to FIG. 2, a rectangular flanged bubble tight damper 200 may include a C-channel web 202 and a flange plate 204. Specifically, conventional damper frames may be tedious to manufacture. For example, extensive welding may lead to increase in labor cost and manufacturing time. Further, improper welding may result in air leakage. Additionally, a four piece frame may increase the pressure drop of the system. The present implementations provide two C-piece frame webs welded together that reduce the leakage risk associated with the frame.

Figure 3:
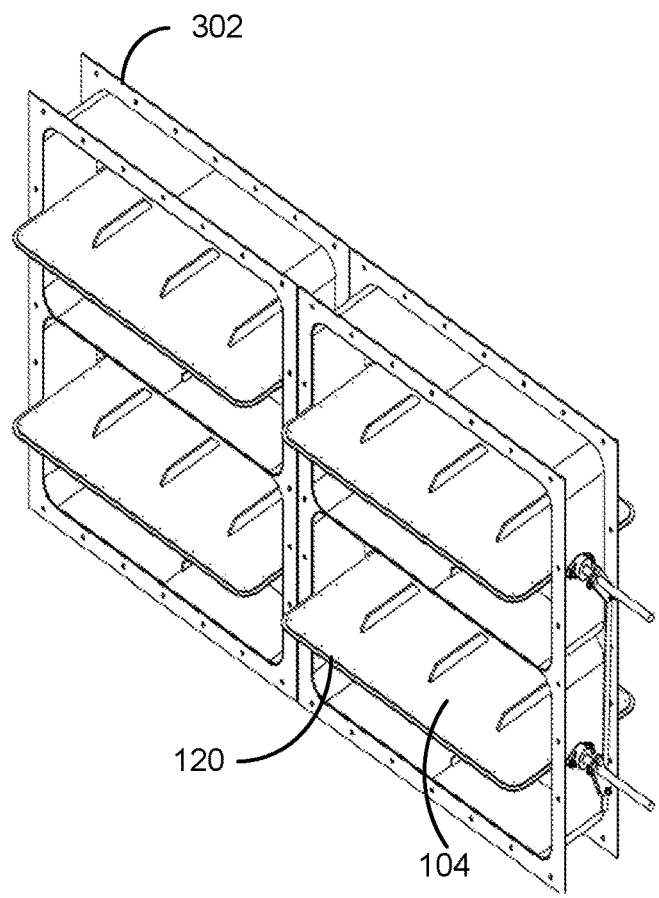
FIG. 3 is a block diagram of an example multiple section damper assembly (2 sections wide×2 sections tall), according to implementations of the present disclosure.

Referring to FIG. 3, a rectangular flanged bubble tight damper 300 may be versatile in size. For instance, some dampers may experience an increase in pressure drop as the number of damper sections increases. However, the present implementations provide a rectangular flanged bubble tight damper 300 that minimizes restrictions to the airflow path. Specifically, the rectangular flanged bubble tight damper 300 includes multiple C-shaped webs as part of the frame 302 and a damper blade 104 along with a blade seal 120. Further, the rectangular flanged bubble tight damper 300 may be lighter in weight and stronger in structure so as to permit stacking of multiple dampers to configure a variable height damper.

Figure 4:
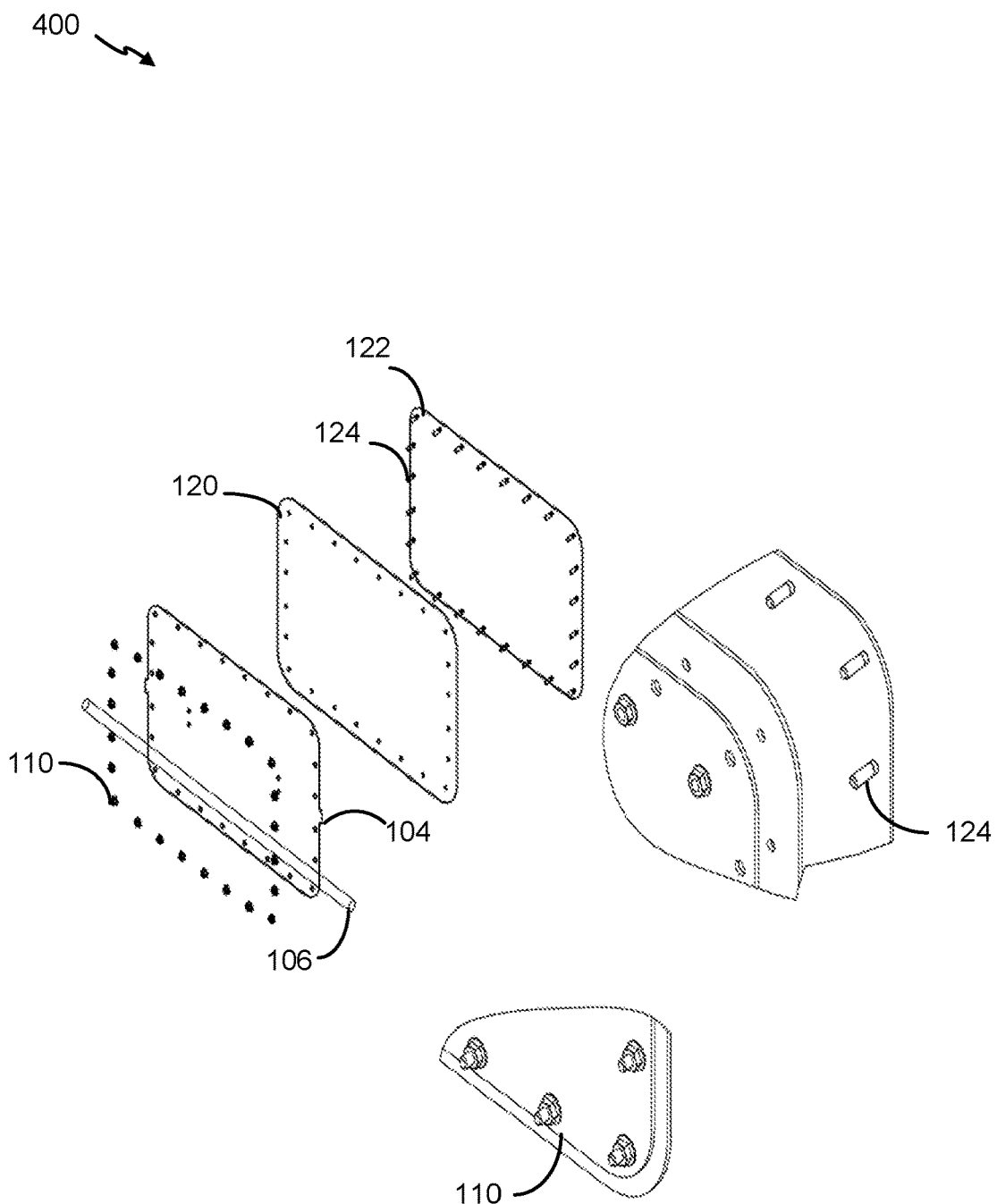
FIG. 4 is a block diagram of an example blade assembly of the damper, according to implementations of the present disclosure.

Referring to FIG. 4, a block diagram of an example blade assembly 400 of the rectangular flanged bubble tight damper 100. The blade assembly 400 employs weld studs 124 to secure the blade assembly 400 and prevent leakage that would otherwise permeate through holes in the blade assembly if through-holes with fasteners were implemented. Also, there is a reduction in the pressure drop value. The weld studs 124 may be located along a periphery of the retainer 122 component. The weld studs 124 provide secure assembly of the blade 104 and blade seal 120 via a corresponding hex lock nut 110 that fastens to each weld stud 124 and tightly holds together the blade 104, blade seal 120, and retainer 122.

Figure 5:
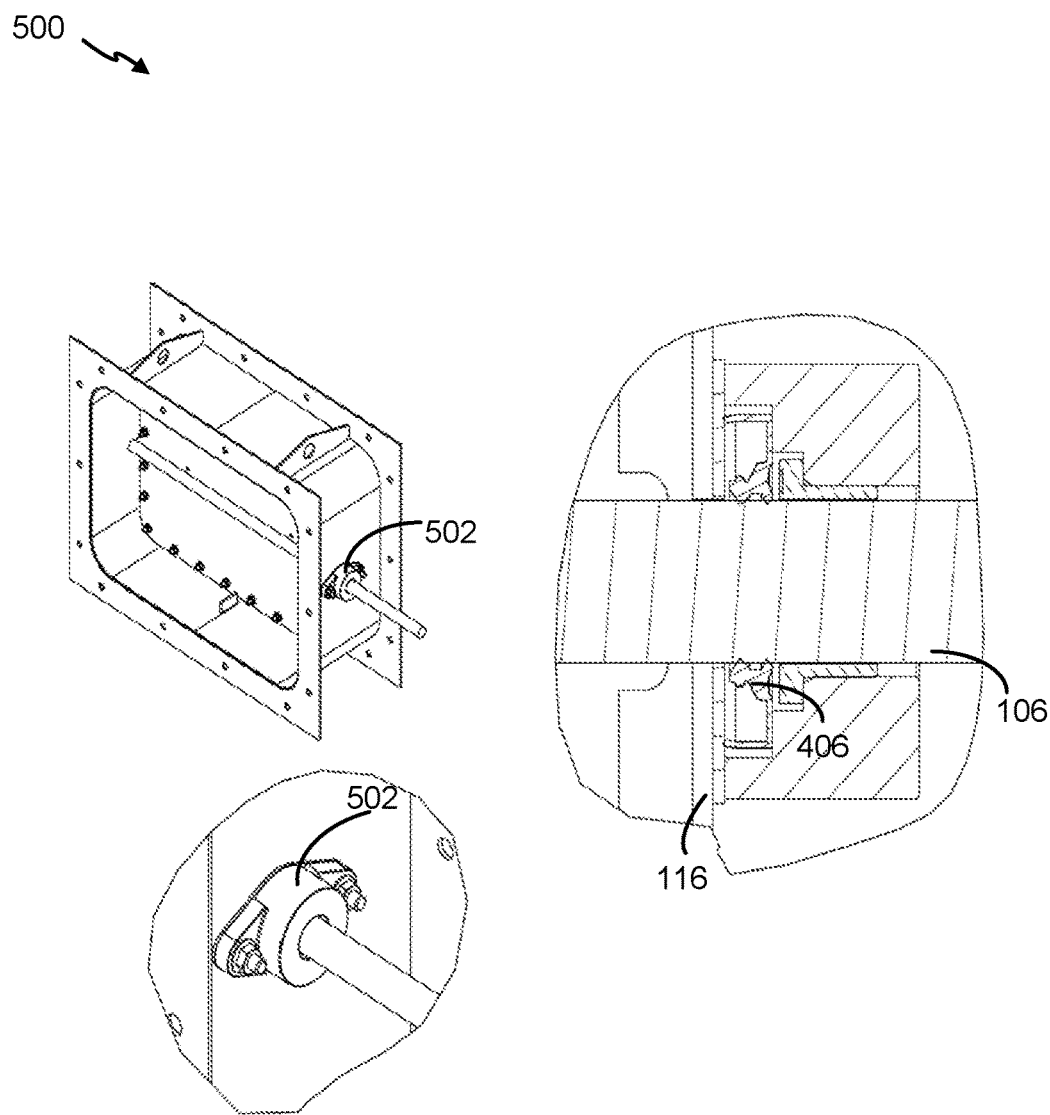
FIG. 5 is a block diagram of an example integral shaft seal bearing assembly of the damper, according to implementations of the present disclosure.

Referring to FIG. 5, a block diagram of a further example of a damper blade 500 of the rectangular flanged bubble tight damper 100. In some dampers, much of the leakage may occur at the axle and/or bearings. The rectangular flanged bubble tight damper 100 may include an integral bearing with shaft seal assembly 406 that prevents leakage in the drive axle 106 at the time of cycle testing. Further, the integral bearing with shaft seal assembly 406 assembly bearings may provide up to three times additional protection on the axle so as to prevent the aforementioned leakage of air.

Example Implementations

Thus, the disclosed damper may have one or more combinations of features.

In one implementation, for example, a frame composed of at least two attached frame webs, each frame web corresponding to a C-shaped component, and a damper blade removably attached to each compartment formed by the frame webs.

In addition to one or more of the above features, the C-shaped component includes a side rectangular portion, a top rectangular portion, and a bottom rectangular portion, wherein the top rectangular portion and the bottom rectangular portion perpendicularly extend from opposing ends of the side rectangular portion In addition to one or more of the above features, each the C-shaped component includes a flat side rectangular portion having two perpendicularly rectangular portions extending therefrom.

In addition to one or more of the above features, the flat side rectangular portion forms a side wall of the frame.

In addition to one or more of the above features, the two perpendicularly rectangular portions are longer in length than the flat side rectangular portion.

In addition to one or more of the above features, each of the first attached frame web and second attached frame web each includes a hole at the flat side rectangular portion.

In addition to one or more of the above features, this implementation may include an axle secured via the hole located at each of the at least two attached frame webs.

In addition to one or more of the above features, the axle secures the damper blade within the frame and is configured to rotate the damper blade between an air flow restriction position to an air flow passage position.

In addition to one or more of the above features, the axle is further configured to rotate the damper blade 90 degrees from the flow restriction position to the air flow passage position.

In addition to one or more of the above features, the damper blade includes a blade seal on one side of the damper blade.

In addition to one or more of the above features, the blade seal covers an entire surface area of one side of the damper blade.

In addition to one or more of the above features, the damper blade is rectangular.

In addition to one or more of the above features, the frame is rectangular.

In addition to one or more of the above features, this implementation may include a flange plate attached to one or both sides of the frame.

In another implementation, for example, an HVAC system comprises a ductwork that carries airflow; and a damper coupled to the ductwork and configured to regulate the airflow, wherein the damper includes: a frame that includes a first attached frame web and a second attached frame web, each of the first attached frame web and the second attached frame web corresponding to a C-shaped component; and a damper blade removably attached to each compartment formed by the frame webs.

In a further implementation, for instance, a damper for an HVAC system comprises a frame including two coupled frame webs, each frame web corresponding to a C-shaped component, each frame web forming a hollow compartment; and a damper blade removably coupled to each hollow compartment.

While the detailed drawings and specific examples given describe various example implementations, they serve the purpose of illustration only. It is to be understood that the present implementations is not limited in its application to the details of construction and the arrangements of components set forth in the preceding description or illustrated in the drawings. The components shown in FIGS. 1-5 collectively make up a rectangular flanged bubble tight damper. However, the examples shown in FIGS. 1-5 are but one way to accomplish the overall concept of the present implementations. Furthermore, other substitutions, modifications, changes, and omissions may be made in the design, operating conditions, and arrangements of the example implementations without departing from the scope of the invention as expressed in the appended claims.

What is claimed is:

1. A damper, comprising:
a frame comprising a first C-shaped component and a second C-shaped component attached to one another to form a rectangular shape of the frame and to define an air flow path through the frame;
an axle rotatably coupled to the first C-shaped component and the second C-shaped component;
a damper blade attached to the axle, wherein the damper blade is configured to rotate between an air flow restriction position and an air flow passage position, and the damper blade is configured to close the air flow path through the frame in the air flow restriction position; and a blade seal extending across an entire surface area of a first surface of the damper blade, wherein the axle is attached to a second surface of the damper blade opposite the first surface.

2. The damper of claim 1, wherein the damper blade is configured to rotate 90 degrees from the air flow restriction position to the air flow passage position.

3. The damper of claim 1, wherein the blade seal extends outwardly beyond a perimeter of the damper blade.

4. The damper of claim 1, wherein the damper blade is rectangular, and, in the air flow restriction position, the damper blade extends from the first C-shaped component to the second C-shaped component to occlude the air flow path through the frame.

5. The damper of claim 1, wherein the first C-shaped component and the second C-shaped component are each formed from sheet metal.

6. The damper of claim 1, comprising a retainer fastened to the damper blade to secure the blade seal to the damper blade, wherein the blade seal is captured between the damper blade and the retainer.

7. A heating, ventilation, and air conditioning (HVAC) system comprising:
a ductwork configured to direct airflow therethrough; and
a damper coupled to the ductwork and configured to regulate the airflow, wherein the damper comprises:
 a frame comprising a first C-shaped component and a second C-shaped component attached to one another to form a rectangular shape of the frame, wherein the first C-shaped component comprises a first side portion, a first perpendicular portion, and a second perpendicular portion, wherein the first perpendicular portion and the second perpendicular portion extend from first opposing ends of the first side portion, and the second C-shaped component comprises a second side portion, a third perpendicular portion, and a fourth perpendicular portion, wherein the third perpendicular portion and the fourth perpendicular portion extend from second opposing ends of the second side portion;
 an axle rotatably coupled to and extending through the first side portion and the second side portion;
 a damper blade attached to the axle, wherein the damper blade is configured to rotate between an air flow restriction position and an air flow passage position to control the airflow directed through the frame, and, in the air flow restriction position, the damper blade extends from the first perpendicular portion to the second perpendicular portion and extends from the third perpendicular portion to the fourth perpendicular portion; and
 a blade seal covering an entire surface area of a first surface of the damper blade, wherein the axle is attached to a second surface of the damper blade opposite the first surface.

8. The HVAC system of claim 7, wherein the first side portion forms a first side wall of the frame, and the second side portion forms a second side wall of the frame.

9. The HVAC system of claim 7, wherein the first side portion comprises a first hole formed therein, the second side portion comprises a second hole formed therein, and the axle extends through the first hole and the second hole.

10. The HVAC system of claim 9, comprising:
a first bearing and a first bearing seal coupled to the axle and positioned adjacent to the first hole; and
a second bearing and a second bearing seal coupled to the axle and positioned adjacent to the second hole.

11. The HVAC system of claim 7, wherein the damper blade is configured to rotate at least 90 degrees from the air flow restriction position to the air flow passage position.

12. The HVAC system of claim 7, wherein the damper blade is rectangular.

13. The HVAC system of claim 7, wherein the blade seal engages with the first side portion, the first perpendicular portion, and the second perpendicular portion of the first C-shaped component and with the second side portion, the third perpendicular portion, and the fourth perpendicular portion of the second C-shaped component in the air flow restriction position.

14. The HVAC system of claim 7, wherein the first C-shaped component and the second C-shaped component are each formed from sheet metal, the first perpendicular portion is welded to the third perpendicular portion, and the second perpendicular portion is welded to the fourth perpendicular portion.

15. The HVAC system of claim 7, comprising a retainer fastened to the damper blade to secure the blade seal to the damper blade, wherein the blade seal is captured between the damper blade and the retainer.

16. A damper for a heating, ventilation, and air conditioning (HVAC) system, comprising:
a frame including two coupled frame webs, each frame web comprising a C-shaped component, and each frame web forming a hollow compartment;
a damper blade removably coupled to each frame web;
a blade seal coupled to the damper blade, wherein the blade seal extends across an entire surface area of a face of the damper blade, and the blade seal is configured to engage with each frame web of the frame in a closed position of the damper blade; and
a retainer fastened to the damper blade to secure the blade seal to the damper blade, wherein the blade seal is captured between the damper blade and the retainer.

17. The damper of claim 16, wherein the retainer is fastened to the damper blade via a plurality of weld studs and a plurality of hex nuts.

* * * * *